(12) United States Patent
Suzuki et al.

(10) Patent No.: US 11,481,835 B2
(45) Date of Patent: Oct. 25, 2022

(54) RENTAL SYSTEM

(71) Applicant: HONDA MOTOR CO., LTD., Tokyo (JP)

(72) Inventors: Atsuyuki Suzuki, Wako (JP); Naoko Imai, Wako (JP); Tomoko Shintani, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 772 days.

(21) Appl. No.: 16/439,828

(22) Filed: Jun. 13, 2019

(65) Prior Publication Data
US 2020/0005389 A1 Jan. 2, 2020

(30) Foreign Application Priority Data
Jul. 2, 2018 (JP) .............................. JP2018-125850

(51) Int. Cl.
*B60W 50/08* (2020.01)
*B60W 10/30* (2006.01)
*G06Q 30/06* (2012.01)
*B60W 50/00* (2006.01)
*B60W 60/00* (2020.01)

(52) U.S. Cl.
CPC ......... *G06Q 30/0645* (2013.01); *B60W 10/30* (2013.01); *B60W 50/0098* (2013.01); *B60W 50/085* (2013.01); *B60W 60/0023* (2020.02); *G06Q 30/06* (2013.01)

(58) Field of Classification Search
CPC ... G06Q 30/0645; G06Q 30/06; B60W 10/30; B60W 50/0098; B60W 50/085; B60W 60/0023; G07F 17/12; G07C 9/00896
See application file for complete search history.

(56) References Cited

U.S. PATENT DOCUMENTS

| | | | | |
|---|---|---|---|---|
| 11,100,465 B1* | 8/2021 | Burge | ........................ | G05F 1/66 |
| 11,104,235 B2* | 8/2021 | Suzuki | ............... | G06Q 30/0645 |
| 2010/0280700 A1* | 11/2010 | Morgal | .................. | G06Q 10/02 |
| | | | | 705/5 |
| 2016/0129803 A1* | 5/2016 | Grewal | ................. | B60W 40/12 |
| | | | | 701/123 |
| 2017/0206475 A1* | 7/2017 | Shoen | ................ | G06Q 30/0645 |
| 2019/0122469 A1* | 4/2019 | Fujiwara | ................ | G06Q 10/02 |
| 2019/0188636 A1* | 6/2019 | Endo | ....................... | G06Q 50/30 |
| 2019/0197468 A1* | 6/2019 | Endo | ....................... | H04W 4/40 |

FOREIGN PATENT DOCUMENTS

| | | |
|---|---|---|
| CN | 104021514 A | 9/2014 |
| CN | 106104624 A | 11/2016 |
| JP | 2006-206225 | 8/2006 |

OTHER PUBLICATIONS

Chinese Office Action dated Feb. 2, 2021, 8 pages.

* cited by examiner

Primary Examiner — Kira Nguyen
(74) Attorney, Agent, or Firm — Rankin, Hill & Clark LLP (57) ABSTRACT

A predicted energy consumption calculation unit calculates, when an on-vehicle apparatus of a rental vehicle is operated during the period of depositing an article in a deposit space of the rental vehicle, a predicted energy consumption that is a predicted value of the amount of energy consumed by the on-vehicle apparatus. A rentable period determination unit determines a rentable period of the deposit space on the basis of the predicted energy consumption calculated by the predicted energy consumption calculation unit.

4 Claims, 5 Drawing Sheets

| PROVIDER ID (32a) | PROVIDER INFORMATION (32b) | VEHICLE INFORMATION (32c) | ELECTRONIC KEY USE CONDITION (32d) | VEHICLE RENTAL CONDITION (32e) | SCHEDULE BOOK (32f) | VEHICLE NONUSE PERIOD (32g) | SCHEDULED USE PERIOD HOUSING CONDITION (32h) | USER INFORMATION (32i) |
|---|---|---|---|---|---|---|---|---|
| Ps-001 | PsIF-A | CARIF-A | BKC-A | RLC-A | SCHIF-A | UUS-A | UTA-001<br>UTA-002<br>UTA-003<br>UTA-004 | PuIF-001<br>PuIF-002<br>PuIF-003<br>PuIF-004 |
| Pt-002 | PsIF-B | CARIF-B | BKC-B | RLC-B | SCHIF-B | UUS-B | UTB-001<br>UTB-002<br>UTB-003 | PuIF-005<br>PuIF-006<br>PuIF-007 |
| Pt-003 | PsIF-C | CARIF-C | BKC-C | RLC-C | SCHIF-C | UUS-C | UTC-001<br>UTC-002<br>UTC-003 | PuIF-008<br>PuIF-009<br>PuIF-010 |
| Pt-004 | PsIF-D | CARIF-D | BKC-D | RLC-D | SCHIF-D | UUS-D | UTD-001<br>UTD-002<br>UTD-003 | PuIF-011<br>PuIF-012<br>PuIF-013 |
| Pt-005 | PsIF-E | CARIF-E | BKC-E | RLC-E | SCHIF-E | UUS-E | UTE-001<br>UTE-002<br>UTE-003 | PuIF-014<br>PuIF-015<br>PuIF-016 |
| .. | .. | .. | .. | .. | .. | .. | .. | .. |

RENTAL SYSTEM

INCORPORATION BY REFERENCE

The present application claims priority under 35 U.S.C. § 119 to Japanese Patent Application No. 2018-125850 filed on Jul. 2, 2018. The content of the application is incorporated herein by reference in its entirety.

BACKGROUND OF THE INVENTION

Field of the Invention

The present invention relates to a rental system that supports the rental of a housing part of a vehicle.

Description of the Related Art

Conventionally, there has been proposed a system in which in response to a request from a communication terminal held by a home delivery dealer, a housing part of a vehicle that is parked at a receiver's home or the like is unlocked and locked so as to house a delivery article in the housing part of the vehicle when the receiver is absent, thereby allowing the delivery to be completed (for example, see Japanese Patent Laid-Open No. 2006-206225).

As a mode of utilizing a housing part of a vehicle that is not in use, such as a system described in Japanese Patent Laid-Open No. 2006-206225, it can be considered that the housing part of the vehicle is rented out as a temporary deposit space for an article. In addition, in renting out the housing part of the vehicle as a deposit space for an article, it is desired to set storage conditions of the article in the housing part according to the characteristics of the article to be housed.

The present invention has been made in view of the background described above, and it is an object of the present invention to provide a storage system capable of setting a rentable period in which storage conditions according to the characteristics of an article to be housed can be maintained when renting the housing part of the vehicle.

SUMMARY OF THE INVENTION

A rental system of an aspect of the present invention is a rental system that supports a service of renting out a housing part of a vehicle as a deposit space for an article. The rental system includes: a predicted energy consumption calculation unit that calculates, when an on-vehicle apparatus of the vehicle is operated during the period of depositing an article in the housing part, a predicted energy consumption that is a predicted value of the amount of energy consumed by the on-vehicle apparatus; and a rentable period determination unit that determines a rentable period of the housing part on the basis of the predicted energy consumption that is calculated by the predicted energy consumption calculation unit.

The rental system may further include a vehicle nonuse period recognition unit that recognizes a vehicle nonuse period that is a period in which a vehicle provider who is an owner of the vehicle or a person having a predetermined relation with the owner does not use the vehicle; and the rentable period determination unit may set the rentable period on the basis of the predicted energy consumption calculated by the predicted energy consumption calculation unit and the vehicle nonuse period recognized by the vehicle nonuse period recognition unit.

The rental system may further include an energy remaining amount recognition unit that recognizes the remaining amount of energy stored in an energy storage unit provided in the vehicle; and the rentable period determination unit may determine the rentable period on the basis of the remaining amount of the energy recognized by the energy remaining amount recognition unit and the predicted energy consumption calculated by the predicted energy consumption calculation unit.

The rental system may further include a rental period extension unit that transmits, when receiving rental extension request information for requesting extension of a rental period beyond the rentable period from a communication terminal of a user renting the housing part, conditional rental extension information notifying that the rental period can be extended according to the rental extension request information by lowering output of the on-vehicle apparatus, to the communication terminal of the user.

In addition, the rental period extension unit may extend the rental period by stopping the on-vehicle apparatus or lowering the output of the on-vehicle apparatus when receiving conditional approval information for approval for extending the rental period by lowering the output of the on-vehicle apparatus, which is transmitted from the communication terminal of the user in response to the reception of the conditional rental extension information.

Further, the on-vehicle apparatus may be an air conditioning apparatus that controls the temperature inside the housing part.

In the rental system according to an aspect of the present invention, the predicted energy consumption calculation unit calculates, when an on-vehicle apparatus is operated during the period of depositing an article in a housing part, a predicted energy consumption that is a predicted value of the amount of energy consumed by the on-vehicle apparatus. Then, the rentable period determination unit determines a rentable period of the housing part, on the basis of the predicted energy consumption. Thus, when it is required to operate an on-vehicle apparatus including an air conditioning apparatus, heater, and sunshade so as to maintain the quality of an article housed in the housing part, a rentable period can be set while preventing the on-vehicle apparatus from becoming unable to operate during the deposit period in consideration of the amount of energy consumption of the on-vehicle apparatus. This allows, in renting out the housing part of the vehicle, setting of a rentable period in which storage conditions according to the characteristics of an article to be housed can be maintained.

DETAILED DESCRIPTION OF THE PREFERRED EMBODIMENTS

1. Configuration of a Rental System

Figure 1:
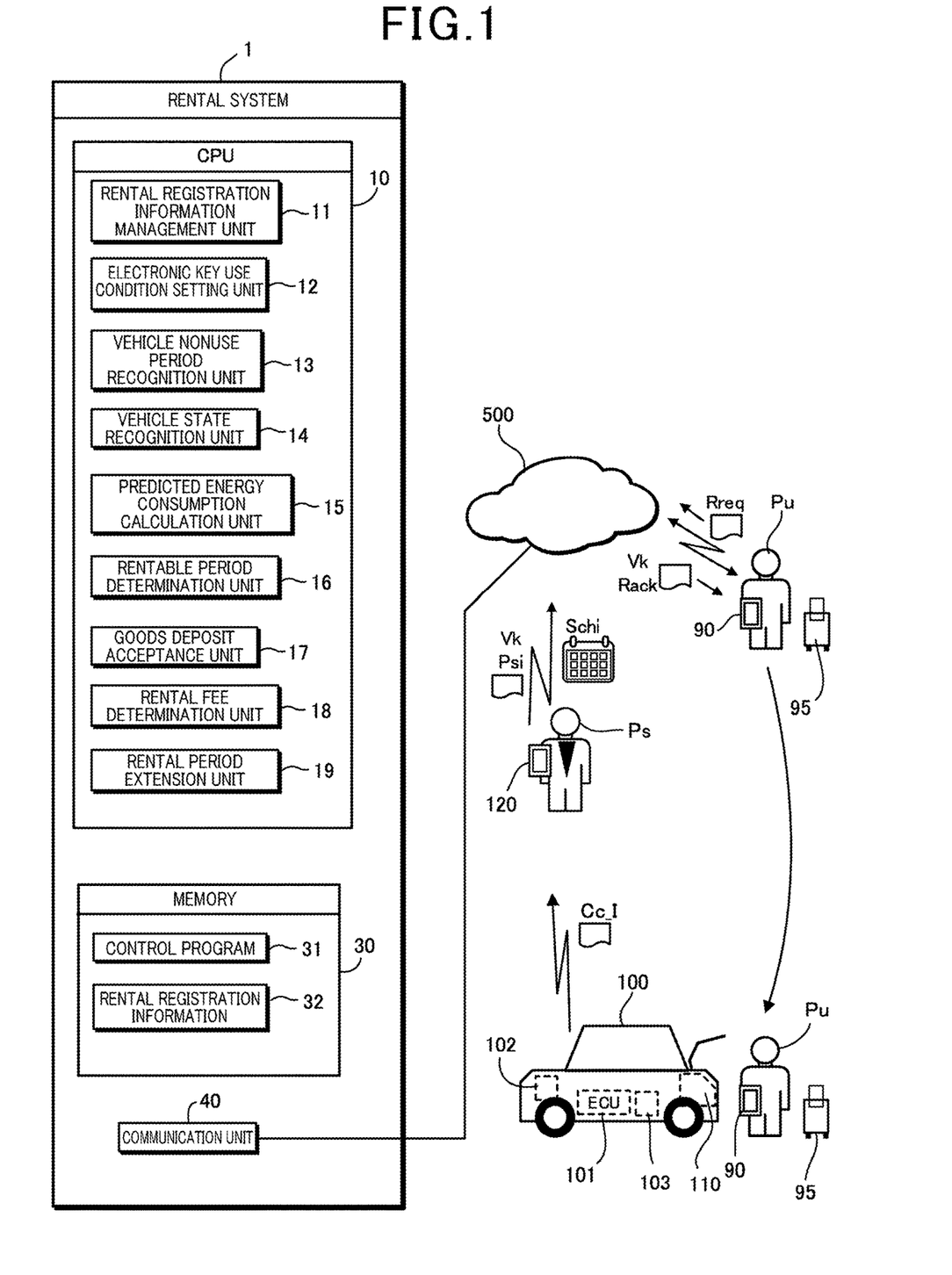
FIG. 1 shows the configuration of a rental system.

FIG. 1 shows the configuration of a rental system 1 of an embodiment. With reference to FIG. 1, the rental system 1 supports a service of renting out, to a user Pu, a deposit space 110 of a housing part (an occupant compartment and luggage compartment capable of housing an article) of a vehicle 100 (hereinafter, also referred to as a rental vehicle 100) that is provided by a vehicle provider Ps who is an owner of the vehicle 100 or a person having a predetermined relation with the owner. In this case, the person having a predetermined relation with the owner corresponds to a person who is a family member or housemate of the owner, etc. and who daily uses the vehicle 100.

The vehicle 100 includes an ECU (electronic control unit) 101 for controlling the operation of the vehicle 100, an on-vehicle apparatus 102, a battery 103, etc. The on-vehicle apparatus 102 includes: an air conditioning apparatus for adjusting the temperature and humidity inside a vehicle compartment including the deposit space 110; a sunshade for blocking sunlight from a window of the vehicle 100; a seat heater, etc. The sunshade includes a curtain-type one and also includes a windowpane having a dimming function.

The rental system 1 is communicably connected via a communication network 500 with: a communication terminal 120 (hereinafter, described as a provider communication terminal 120) that is used by the vehicle provider Ps who provides the deposit space 110; and a communication terminal 90 (hereinafter, described as a user communication terminal 90) that is used by the user Pu who deposits goods 95 by renting the deposit space 110. Communication connection between those communication elements may be either wired connection or wireless connection. As the provider communication terminal 120 and user communication terminal 90, a smart phone, cell phone, tablet terminal, etc. are used.

The user Pu accesses the rental system 1 by using the user communication terminal 90 and reserves the use of the deposit space 110 of the vehicle 100. Then, the user Pu takes goods 95 to a parking place of the vehicle 100, unlocks and locks the deposit space 110 by using an electronic key (virtual key) Vk that has been transmitted from the rental system 1 to the user communication terminal 90, and houses the goods 95 in the deposit space 110. After that, the user Pu returns to the parking place of the vehicle 100 before a reserved rental period passes, unlocks and locks the deposit space 110 by using the electronic key Vk, and receives the goods 95.

The rental system 1 is a computer system configured by a CPU (Central Processing Unit) 10, a memory 30, a communication unit 40, various interface circuits (not illustrated), etc. The CPU 10 reads and executes a control program 31 for the rental system 1 which is stored in the memory 30, thereby functioning as a rental registration information management unit 11, an electronic key use condition setting unit 12, a vehicle nonuse period recognition unit 13, a vehicle state recognition unit 14, a predicted energy consumption calculation unit 15, a rentable period determination unit 16, a goods deposit acceptance unit 17, a rental fee determination unit 18, and a rental period extension unit 19.

The memory 30 stores the control program 31; and also stores information such as rental registration information 32 in which information on each of vehicle providers who have performed use registration of a deposit space rental service using the rental system 1, information on deposit spaces, etc. are recorded.

In an example of FIG. 1, the rental registration information management unit 11 receives provider information Psi (including the profile of a vehicle provider Ps, information on a provided vehicle 100, etc.) that is transmitted from the provider communication terminal 120 of the vehicle provider Ps and schedule book information Schi that shows the action schedule of the vehicle provider Ps; issues a provider ID (identification) that is identification information of the vehicle provider Ps; and records them in the rental registration information 32. In addition, the rental registration information management unit 11 receives from the provider communication terminal 120 an electronic key Vk for unlocking a door of the vehicle 100 provided as a deposit space.

Figure 2:
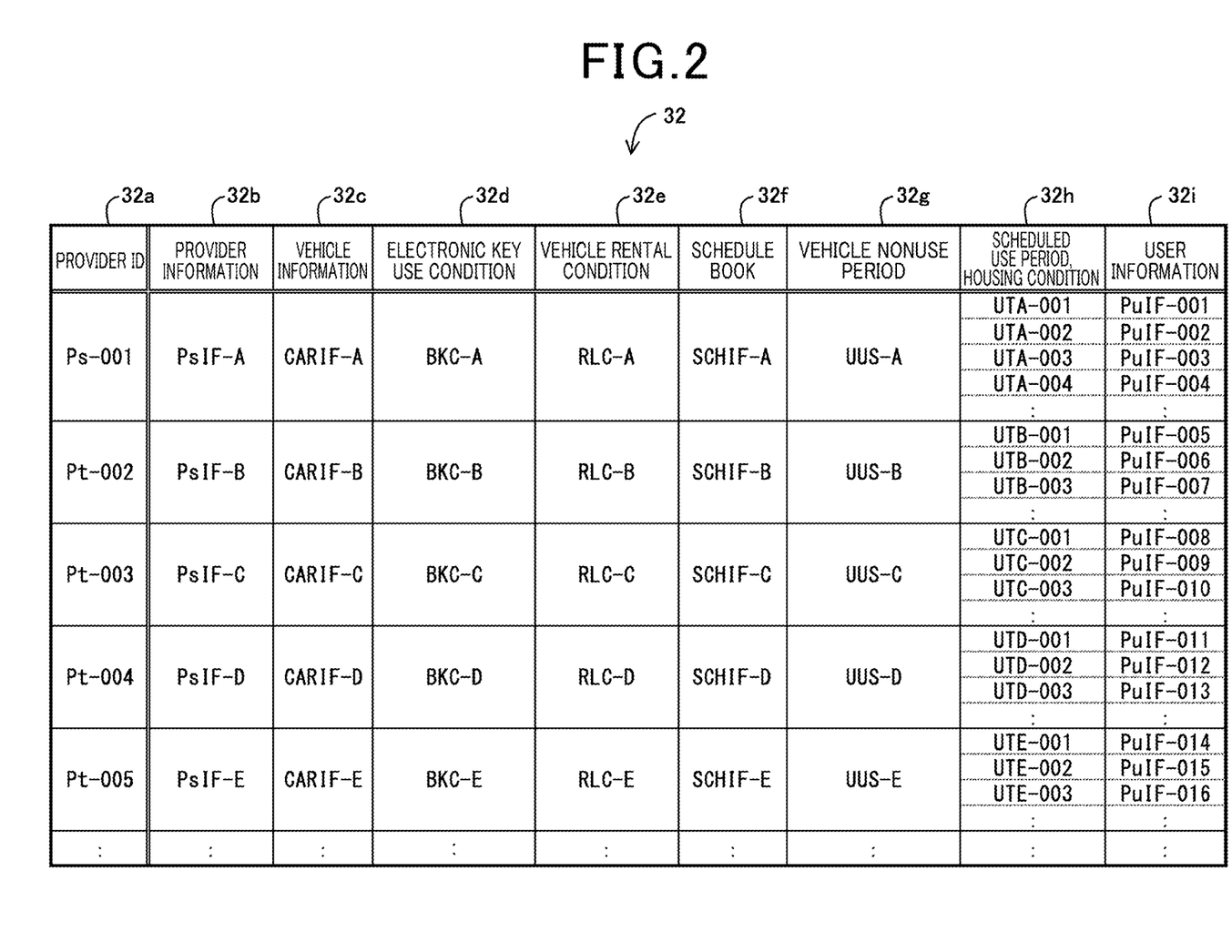
FIG. 2 shows an illustration of rental registration information.

As shown in FIG. 2, in the rental registration information 32, there are recorded in association with a provider ID 32*a* of each of the providers who have performed a deposit space rental registration: provider information 32*b* (the profile of a provider, the communication address of a provider communication terminal used by the provider, etc.); vehicle information 32*c* (the parking position, model, registration number, color, electronic key, etc. of a provided vehicle); an electronic key use condition 32*d* (restrictions on a door unlockable by an electronic key, etc.); a rental condition 32*e* (the allowable size of goods for housing, type of an on-vehicle apparatus such as an air conditioning apparatus, etc.); a schedule book 32*f*; a vehicle nonuse period 32*g*; a scheduled use period/housing condition 32*h*; and user information 32*i* (communication address of the user communication terminal, etc.).

The provider communication terminal 120 transmits to the rental system 1 the schedule book information Schi that is managed by a schedule management application used in the provider communication terminal 120. The schedule management application transmits, when addition, correction, or change has been made in the schedule of the vehicle provider Ps which is registered in the schedule book, updated schedule book information Schi to the rental system 1. Then, the rental registration information management unit 11 receives the updated schedule book information Schi and updates the schedule book 32*f* of the rental registration information 32. Alternatively, not through the schedule management application, the vehicle provider Ps may access the rental system 1 by using the provider communication terminal 120 and directly input his/her own schedule.

The electronic key use condition setting unit 12 sets the use condition of an electronic key Vk of the vehicle 100 rented from the vehicle provider Ps according to a request of the vehicle provider Ps, for example, as described below:

(Use condition 1) Inhibit the start (ignition ON) of the vehicle 100 by the electronic key Vk. This disables the use of the vehicle 100 other than the use as a deposit space.

(Use condition 2) Restrict a period in which a door of the vehicle 100 can be unlocked by the electronic key Vk, to only within the scheduled use period of the deposit space so as to inhibit unlocking of the door of the vehicle 100 by the electronic key Vk outside the scheduled use period. This prevents a door of the vehicle 100 from being unlocked outside the scheduled use period.

(Use condition 3) Limit unlocking of a door of the vehicle 100 using the electronic key Vk only to any door other than for the driver's seat, thereby inhibiting unlocking using the electronic key Vk for the driver's seat. This can eliminate the necessity for the driver to readjust the driver's seat position in using the vehicle 100 after the driver's seat position has been changed in housing goods on the driver's seat.

(Use condition 4) Limit unlocking of a door of the vehicle 100 using the electronic key Vk only to a trunk, thereby inhibiting unlocking of doors other than for the trunk. This prevents an occupant compartment from being soiled in putting and taking goods in and from the occupant compartment.

The vehicle nonuse period recognition unit 13 recognizes a vehicle nonuse period that is a period in which the vehicle 100 is parked unused in a parking space at home, etc. and can be rented out as a deposit space, on the basis of the schedule book 32*f* recorded in the rental registration information 32. The vehicle nonuse period recognition unit 13 sets, for example, when the following target action schedule has been registered in the schedule book 32*f*, a target scheduled period as a vehicle nonuse period.

(Target action schedule) Going out by public transportation such as train, bus, etc. When the vehicle provider Ps goes out by public transportation, the vehicle 100 is not used and therefore, a period during the action can be estimated to be a vehicle nonuse period.

The vehicle state recognition unit 14 recognizes the state of the rental vehicle 100 by obtaining vehicle state information Cc_I that is transmitted by the ECU (electronic control unit) 101 of the vehicle 100. The information shows the operation state of the on-vehicle apparatus 102 of the vehicle 100, the remaining capacity of the battery 103, and, if the vehicle 100 includes an internal combustion engine, the remaining amount of fuel in a fuel tank (not illustrated), etc. It is noted that the configuration in which the vehicle state recognition unit 14 recognizes the remaining capacity of the battery 103 and the remaining amount of fuel in the fuel tank corresponds to the energy remaining amount recognition unit of the present invention. In addition, the battery 103 and fuel tank correspond to the energy storage unit of the present invention.

The predicted energy consumption calculation unit 15 calculates predicted energy consumption when it is required to operate the on-vehicle apparatus 102 so as to maintain the housing condition for an article in housing the article in the deposit space 110. If, for example, an article to be housed in the deposit space 110 is food and it is specified to store it at 25° C. or lower, and the deposit period (a period in which the article is housed in the deposit space 110) is X hours, the predicted energy consumption calculation unit 15 calculates a predicted energy consumption Eec that is a predicted value of energy consumption in the deposit period by using the following equation (1):

$Eec = Cec \times X (\text{hour})$ wherein Eec: predicted energy consumption; Cec: per-hour energy consumption of the on-vehicle apparatus 102 (air conditioning apparatus, seat heater, sunshade, etc.); and X: a deposit period.

In this case, the energy consumption represents electric power when the vehicle 100 is an electric vehicle, and it represents fuel consumption when the vehicle 100 is a vehicle in which electricity is generated using a fuel such as gasoline by an internal combustion engine.

The rentable period determination unit 16 sets the rentable period of the deposit space 110 of the vehicle 100 on the basis of: the vehicle nonuse period recognized by the vehicle nonuse period recognition unit 13, the remaining capacity of the battery 103 recognized by the vehicle state recognition unit 14, and the predicted energy consumption calculated by the predicted energy consumption calculation unit 15.

Figure 3:
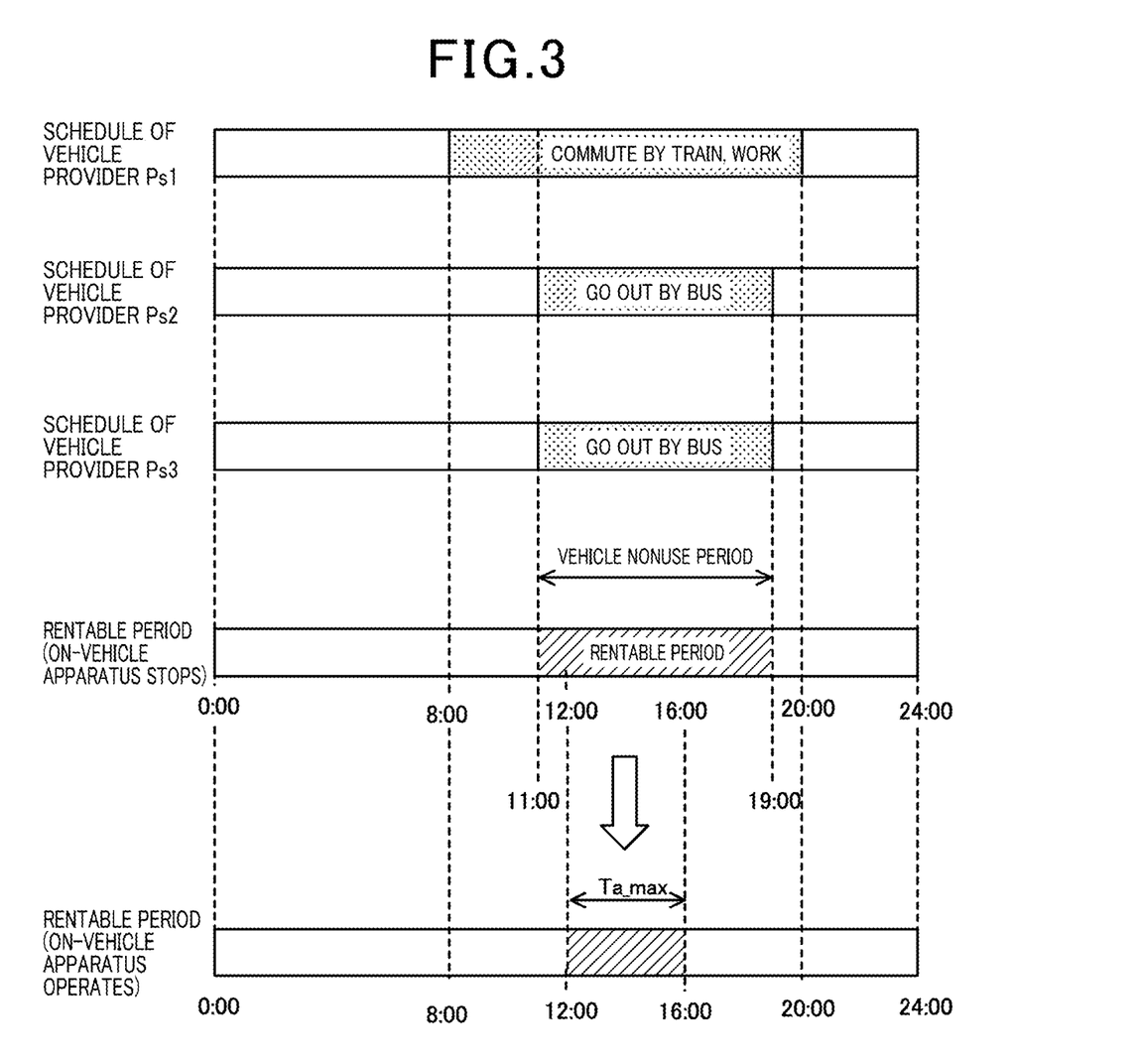
FIG. 3 shows an illustration of an example of setting a rentable period based on the schedules of persons who rent out.

Here, FIG. 3 shows an example of setting a rentable period. FIG. 3 shows a case in which three vehicle providers Ps1, Ps2, and Ps3 daily use one vehicle. The vehicle providers Ps1, Ps2, and Ps3 are, for example, family members who live in the same house. In the schedule book of the vehicle provider Ps1, an action schedule of commuting by train and working from 8:00 AM to 8:00 PM is registered. In both the schedule books of the vehicle providers Ps2 and Ps3, an action schedule of going out by bus from 11:00 AM to 7:00 PM is registered.

The vehicle nonuse period recognition unit 13 recognizes, as a vehicle nonuse period, a period from 11:00 AM to 7:00 PM in which all three of the vehicle providers Ps1, Ps2, and Ps3 go out without using the vehicle and thus the vehicle is not used.

The rentable period determination unit 16 sets a rentable period on the basis of whether or not to operate the on-vehicle apparatus 102 according to the housing condition of the deposit space 110. When, for example, the on-vehicle apparatus 102 is not operated during a deposit period, the rentable period determination unit 16 sets the vehicle nonuse period (11:00 AM to 7:00 PM) as a rentable period.

In addition, when the on-vehicle apparatus 102 is operated during a deposit period, the rentable period determination unit 16 calculates the maximum operable time Ta_max that is time in which the on-vehicle apparatus 102 can be operated until the remaining capacity of the battery 103 and the remaining amount of fuel reach predetermined levels, on the basis of the remaining capacity of the battery 103 and the remaining amount of fuel, and the power consumption of the on-vehicle apparatus 102 during the deposit period.

In this case, when the vehicle 100 is an electric vehicle using only the battery 103 as a driving source, it is only necessary to calculate the maximum operable time Ta_max from the remaining capacity of the battery 103. However, if the rental vehicle 100 includes a power generator that operates by an internal combustion engine, the maximum operable time Ta_max is calculated in consideration of the remaining amount of fuel in the fuel tank.

In addition, the rentable period determination unit 16 sets, in receiving an inquiry about the deposit space 110 from the user communication terminal 90, a period until the maximum operable time Ta_max has passed from the start time of use, as a rentable period.

An example of FIG. 3 shows a case in which when the on-vehicle apparatus 102 is operated during a deposit period, the maximum operable time Ta_max is four hours and the use of the deposit space 110 starts from 12:00 AM. The rentable period determination unit 16 sets a period from 12:00 AM to 4:00 PM as a rentable period.

The goods deposit acceptance unit 17 receives rental reservation information Rreq transmitted from the user communication terminal 90, accepts the use of the deposit space 110, and transmits the electronic key Vk of the vehicle 100 and a reservation completion notification Rack to the user communication terminal 90. The rental reservation information Rreq includes information indicating a housing condition in a deposit period, a necessity to operate the on-vehicle apparatus 102, etc. The goods deposit acceptance unit 17 records a housing condition (including information such as the presence/absence of the on-vehicle apparatus 102 to be operated during the deposit period, an operation condition, etc.) according to the information included in the rental reservation information, in the rental registration information 32.

The goods deposit acceptance unit 17 accepts the application for the use of a deposit space by the rental reservation information Rreq transmitted from the user communication terminal 90, within the vehicle nonuse period 32*g* of each of deposit spaces which is recorded in the rental registration information 32 as described above. Then, it sequentially records, in the rental registration information 32, a scheduled use period and housing condition 32h with which the application has been made and user information 32i of the user Pu who has made the application.

In an example of FIG. 2, for a provider for which Ps-001 is assigned as a provider ID, a vehicle nonuse period UUS-A is set. In the vehicle nonuse period UUS-A, the scheduled use period and housing conditions UTA-001, UTA-002, UTA-003, . . . and user information PuIF-001, PuIF-002, PuIF-003, . . . are registered.

The rental fee determination unit 18 determines a rental fee of the deposit space 110 according to both the operation state of the on-vehicle apparatus 102 during a deposit period and the time at which deposit is accepted. For example, the rental fee determination unit 18 sets a higher fee for more power consumption of the on-vehicle apparatus to be operated during a deposit period. In addition, the rental fee determination unit 18 sets a higher rental fee during busy seasons such as tourist seasons in which a rental request of the deposit space 110 is expected to increase; and sets a lower fee during off seasons. Further, the rental fee determination unit 18 may set a higher fee for larger size of the rental vehicle 100 or for a larger capacity of the deposit space 110 according to the size of the rental vehicle 100 or capacity of the deposit space 110.

The rental period extension unit 19 performs, when receiving information for requesting the extension of the rental period from the user communication terminal 90 of the user Pu who has deposited goods in the deposit space 110, processing of extending the rental period in consideration of whether or not the on-vehicle apparatus 102 operates during the deposit period.

Figure 4:
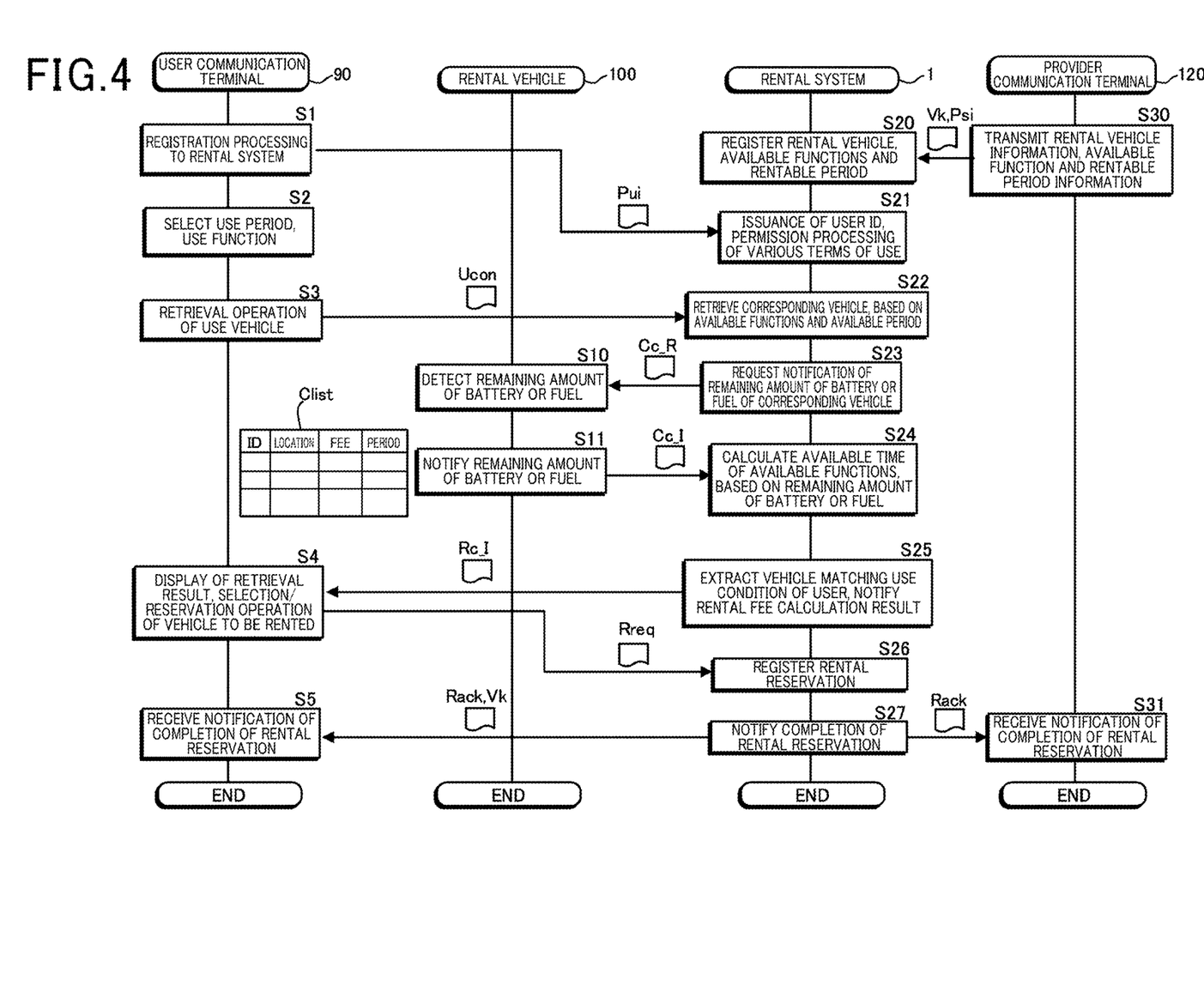
FIG. 4 shows a flowchart of a series of processing in accepting a reservation for renting a housing part of a vehicle by the rental system.

2. Processing from Recording of Rental Registration Information to Rental Reservation Next, described according to a flowchart shown in FIG. 4 is a series of processing executed by the rental system 1, rental vehicle 100, user communication terminal 90, and provider communication terminal 120 until the completion of rental reservation after the recording of rental registration information in a situation shown in FIG. 1.

The provider communication terminal 120 transmits, at step S30, in response to an operation by the vehicle provider Ps, both provider information Psi including information on the rental vehicle 100 and information on available functions, a rentable period, etc. and an electronic key Vk for unlocking and locking the deposit space 110 of the rental vehicle 100, to the rental system 1. The rental registration information management unit 11 of the rental system 1 records the electronic key Vk and provider information Psi that are received from the provider communication terminal 120, in corresponding portions of the rental registration information 32 stored in the memory 30. This enables the rental of the deposit space 110 of the rental vehicle 100.

The user communication terminal 90 transmits, at step S1, user information Pui that has been input by user Pu's registration processing to the rental system 1, to the rental system 1. The user information Pui includes the profile of the user Pu and communication address of the user communication terminal 90. The rental registration information management unit 11 of the rental system 1 performs, at step S21, issuance of a user ID of the user Pu and permission processing for various terms of use.

The user communication terminal 90 transmits, at step S3, in response to a deposit space retrieval operation by the user Pu, use condition information Ucon specifying the use period and housing condition (such as the necessity of the operation of an on-vehicle apparatus) of a deposit space, to the rental system 1. The goods deposit acceptance unit 17 of the rental system 1 retrieves, at step S22, a rental vehicle whose available functions and available period meet the condition specified by the use condition information Ucon (hereinafter, referred to as a candidate rental vehicle) from among the rental vehicles recorded in the rental registration information 32.

At a subsequent step S23, the vehicle state recognition unit 14 of the rental system 1 transmits the remaining amount notification request information Cc_R requesting a notification of the remaining amount of the battery or fuel of the rental vehicle, to the candidate rental vehicle. The candidate rental vehicle ECU detects, at step S10, the remaining capacity of battery and the remaining amount of fuel. Then, at a subsequent step S11, the candidate rental vehicle ECU transmits the vehicle state information Cc_I indicating the remaining amount of battery or fuel to the rental system 1.

The vehicle state recognition unit 14 of the rental system 1 recognizes the remaining capacity of the battery and remaining amount of fuel of the candidate rental vehicle on the basis of the vehicle state information Cc_I received from the candidate rental vehicle. In addition, the predicted energy consumption calculation unit 15 calculates a predicted energy consumption for a case in which an on-vehicle apparatus is operated during a deposit period.

Then, the rentable period determination unit 16 calculates, for each of candidate rental vehicles, a rentable period in a state where an on-vehicle apparatus is being operated, and extracts candidate rental vehicles that match the use condition for the user Pu. In addition, the rental fee determination unit 18 calculates a rental fee for each of the extracted candidate rental vehicles. The goods deposit acceptance unit 17 transmits rental condition information Rc_I including both the rentable period of each of the candidate rental vehicles that is set by the rentable period determination unit 16 and the rental fee of the deposit space of each of the candidate rental vehicle that is calculated by the rental fee determination unit 18, to the user communication terminal 90.

The user communication terminal 90 displays, on a display unit, a list Clist of the ID, location, rental fee, and rental period of each of the candidate rental vehicles on the basis of the rental condition information Rc_I. Then, in response to a selection operation by the user Pu, the user communication terminal 90 transmits rental reservation information Rreq requesting a reservation of any one of the candidate rental vehicle, to the rental system 1.

The goods deposit acceptance unit 17 of the rental system 1 records, at step S26, a specified period and housing condition for the candidate rental vehicle specified by the rental reservation information Rreq, in the rental registration information 32, completing the rental reservation. At a subsequent step S27, the goods deposit acceptance unit 17 transmits both a reservation completion notification Rack notifying the completion of rental reservation and an electronic key Vk to the user communication terminal 90. In addition, the goods deposit acceptance unit 17 also transmits the reservation completion notification Rack to a communication terminal of a provider of the rental vehicle for which reservation is completed (to the provider communication terminal 120 if the vehicle 100 has been reserved).

3. Extension Processing of a Rental Period

Figure 5:
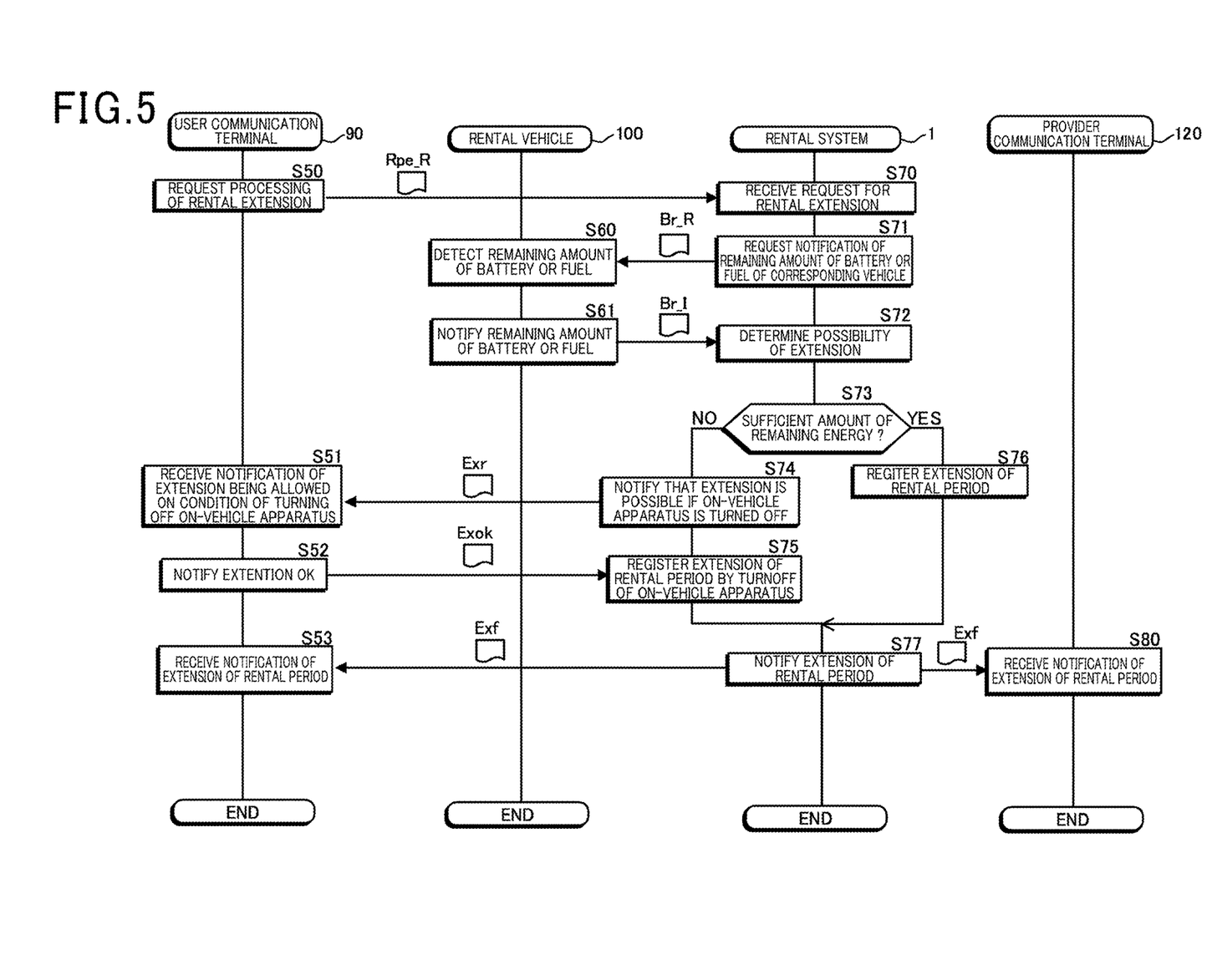
FIG. 5 shows a flowchart of a series of processing in dealing with a request for extending a rental period by the rental system.

Next, described according to a flowchart shown in FIG. 5 is a series of processing executed by the user communication terminal 90, rental vehicle 100, rental system 1, and provider communication terminal 120 when the user Pu who has rented the deposit space 110 of the rental vehicle 100 and have housed goods 95 in the space requests the extension of a rental period in a situation shown in FIG. 1.

The user communication terminal 90 transmits, in response to the operation of requesting the extension of the rental period by the user Pu, rental extension request information Rpe_R requesting the extension of the rental period, to the rental system 1. The rental period extension unit 19 of the rental system 1 transmits, when receiving the rental extension request information Rpe_R at step S70, remaining amount notification request information Br_R requesting the notification of the remaining capacity of the battery and remaining amount of fuel of the rental vehicle 100, to the rental vehicle 100 at a subsequent step S71.

The ECU 101 of the rental vehicle 100 detects, when receiving the remaining amount notification request information Br_R at a step S60, the remaining capacity of the battery and remaining amount of fuel of the rental vehicle 100 at a subsequent step S61; and transmits the remaining amount notification information Br_I notifying the remaining capacity of the battery and remaining amount of fuel, to the rental system 1. The rental period extension unit 19 of the rental system 1 determines, at step S72, whether or not it is possible to extend the rental period while continuing the operation of the on-vehicle apparatus 102, according to the energy consumption of the on-vehicle apparatus 102 and the remaining capacity of the battery and remaining amount of fuel of the rental vehicle 100.

Then, at a subsequent step S73, the rental period extension unit 19 proceeds with the processing to step S76 when it is possible to extend the rental period while continuing the operation of the on-vehicle apparatus 102 (when there is a sufficient amount of remaining energy in the rental vehicle 100). At step S76, the rental period extension unit 19 records information on the extended rental period in the rental registration information 32 and proceeds with the processing to step S77.

On the other hand, when it is impossible to extend the rental period while continuing the operation of the on-vehicle apparatus 102 due to an insufficient remaining amount of the battery 103 or fuel of the rental vehicle 100, the rental period extension unit 19 proceeds with the processing from step S73 to step S74. Then, the rental period extension unit 19 transmits, at step S74, conditional rental extension information Exr notifying that the rental period can be extended if the on-vehicle apparatus 102 is turned off (stopped), to the user communication terminal 90.

The user communication terminal 90 that has received the conditional rental extension information Exr at step S51 transmits, at a subsequent step S52, in response to an operation of approving the conditional extension by the user Pu, conditional approval information Exok for approving the conditional extension of the rental period, to the rental system 1.

The rental period extension unit 19 of the rental system 1 records, at step S75, in response to reception of the conditional approval information Exok, the extended rental period and a change in the housing condition (stop of the on-vehicle apparatus 102) into the rental registration information 32 and proceeds with the processing to step S77. At step S77, the rental period extension unit 19 transmits an extension completion notification Exf notifying that the rental period has been extended, to the user communication terminal 90 and provider communication terminal 120.

The user communication terminal 90 receives, at step S53, the extension completion notification Exf from the rental system 1. In addition, the provider communication terminal 120 receives, at step S80, the extension completion notification Exf from the rental system 1.

Through the above-described processing by the rental period extension unit 19, if the remaining capacity of the battery 103 or fuel of the rental vehicle 100 is insufficient, the rental period can be extended by stopping the on-vehicle apparatus 102 on condition of approval by the user Pu. This allows the rental period to be extended in a case where, for example, a period to be extended is short and the quality of an article housed in the deposit space 110 will not be degraded if the on-vehicle apparatus 102 is stopped, thereby improving the user-friendliness for the user Pu.

4. Other Embodiments

In the above-described embodiment, at steps S73 to S74 in FIG. 5, the rental period extension unit 19 notifies that the rental period can be extended by stopping the on-vehicle apparatus 102; however, the unit may notify that the rental period can be extended by lowering the output of the on-vehicle apparatus 102. When, for example, the on-vehicle apparatus 102 is an air conditioning apparatus and a housing condition is set such that the temperature of the deposit space 110 is kept 25° C. or lower, it is considered that the cooling temperature having been set to 25° C. may be raised to 28° C. In this case, it is expected that by raising the cooling temperature, the output of the air conditioning apparatus (output of a compressor) is lowered and the energy consumption of the air conditioning apparatus is reduced, thereby enabling the extension of the rental period.

In the above-described embodiment, at step S75 in FIG. 5, the rental period extension unit 19 extends, when receiving the conditional approval information Exok from the user communication terminal 90, the rental period by stopping the on-vehicle apparatus 102; however, the processing at step S75 may be omitted. In this case, the user Pu who has checked the conditional rental extension information Exr received by the user communication terminal 90 at step S51 accesses the rental system 1 by using the user communication terminal 90 and performs procedures for changing the housing condition (stopping the on-vehicle apparatus 102) and extending the rental period.

It is noted that although FIG. 1 is a schematic diagram illustrating a functional configuration of the rental system 1 while dividing it by major processing contents for easy understanding of the present invention, the configuration of the rental system 1 may be a configuration by another division. In addition, processing for each component may be either executed by one hardware unit or executed by a plurality of hardware units. Further, processing for each component indicated in FIG. 4 and FIG. 5 may be either executed by one program or executed by a plurality of programs.

REFERENCE SIGNS LIST

1 . . . rental system, 10 . . . CPU, 11 . . . rental registration information management unit, 12 . . . electronic key use condition setting unit, 13 . . . vehicle nonuse period recognition unit, 14 . . . vehicle state recognition unit, 15 . . . predicted energy consumption calculation unit, 16 . . . rentable period determination unit, 17 . . . goods deposit acceptance unit, 18 . . . rental fee determination unit, 19 . . . rental period extension unit, 30 . . . memory, 31 . . .

control program, 32 . . . rental registration information, 40 . . . communication unit, 90 . . . user communication terminal, 100 . . . rental vehicle, 101 . . . ECU, 102 . . . on-vehicle apparatus, 103 . . . battery, 110 . . . deposit space, 120 . . . provider communication terminal, Ps . . . vehicle provider, Pu . . . user of a deposit space.

What is claimed is:

1. A rental system supporting a service of renting out a housing part of a vehicle as a deposit space for an article, wherein the rental system is communicably connected via a communication network with an ECU of the vehicle and a user terminal that is a communication terminal used by a user who deposits the article by renting the deposit space, and comprises a CPU and a memory, wherein,
the memory stores information on a plurality of vehicles of which use registration of the deposit space rental service is performed,
the CPU:
acquires a remaining capacity of a battery of the vehicle transmitted from the ECU of the vehicle, a remaining amount of fuel of the vehicle transmitted from the ECU of the vehicle, a use period, by the user, transmitted from the user terminal, and a housing condition of the deposit space, by the user, transmitted from the user terminal,
calculates a predicted energy consumption that is a predicted value of an amount of energy consumed by an on-vehicle apparatus when the on-vehicle apparatus, of the vehicle, including an air conditioning apparatus, a seat heater, and a sunshade is operated during the period of depositing the article in the housing part based on an energy consumption per hour when the on-vehicle apparatus is operated under the housing condition and the use period,
extracts, from the plurality of vehicles of which use registration of the deposit space rental service is performed, a candidate rental vehicle, which is a candidate for renting the deposit space, based on the predicted energy consumption calculated, the remaining capacity of the battery of the vehicle, and the remaining amount of fuel of the vehicle, and
transmits information on the extracted candidate rental vehicle to the user terminal, wherein
the housing condition includes presence or absence of the on-vehicle apparatus to be operated and an operation condition for the on-vehicle apparatus to be operated.

2. The rental system according to claim 1, wherein the CPU
recognizes a vehicle nonuse period, the vehicle nonuse period being a period in which a vehicle provider who is an owner of the vehicle or a person having a predetermined relation with the owner does not use the vehicle, and
determines a rental vehicle based on the predicted energy consumption calculated and the vehicle nonuse period recognized.

3. The rental system according to claim 1, wherein the CPU
transmits, when receiving rental extension request information for requesting extension of a rental period beyond the use period from the communication terminal of the user renting the housing part, conditional rental extension information notifying that the rental period can be extended according to the rental extension request information by stopping the on-vehicle apparatus or lowering the output of the on-vehicle apparatus, to the communication terminal of the user.

4. The rental system according to claim 3, wherein:
the CPU extends the rental period by stopping the on-vehicle apparatus or lowering the output of the on-vehicle apparatus when receiving conditional approval information for approval for extending the rental period by lowering the output of the on-vehicle apparatus, the conditional approval information being transmitted from the communication terminal of the user in response to the reception of the conditional rental extension information.

* * * * *